US012700378B2

United States Patent
(12) United States Patent
Konttori et al.

(10) Patent No.: US 12,700,378 B2
(45) **Date of Patent: *Aug. 4, 2026**

(54) DISPLAY DEVICE WITH BACKLIGHT UNIT HAVING SWITCHABLE MULTI-COLOURED LIGHTSOURCES

(71) Applicant: Distance Technologies Oy, Helsinki (FI)

(72) Inventors: Urho Konttori, Helsinki (FI); Mikko Strandborg, Hangonkylä (FI)

(73) Assignee: Distance Technologies Oy, Helsinki (FI)

(*) Notice: Subject to any disclaimer, the term of this patent is extended or adjusted under 35 U.S.C. 154(b) by 0 days.

This patent is subject to a terminal disclaimer.

(21) Appl. No.: 19/020,344

(22) Filed: Jan. 14, 2025

(65) Prior Publication Data

US 2026/0204233 A1 Jul. 16, 2026

(51) Int. Cl.
*G09G 3/34* (2006.01)

(52) U.S. Cl.
CPC ... *G09G 3/3413* (2013.01); *G09G 2320/0666* (2013.01)

(58) Field of Classification Search
None
See application file for complete search history.

(56) References Cited

U.S. PATENT DOCUMENTS

2007/0018919 A1 1/2007 Zavracky et al.
2011/0279739 A1* 11/2011 Nairn ................... H04N 9/3182 345/207
2012/0176419 A1* 7/2012 Otoi ................... H04N 21/4318 345/102
2013/0176353 A1 7/2013 Park et al.
2014/0268633 A1* 9/2014 Kwon .................. G09G 3/2025 362/97.1
2016/0154269 A1* 6/2016 Fukuoka .................. G09G 3/34 345/87
2017/0223318 A1* 8/2017 Xu .......................... G02B 27/09
2019/0129274 A1* 5/2019 Wang .................. G02F 1/13306
2022/0397798 A1* 12/2022 Li ...................... G02F 1/133607
2023/0317021 A1 10/2023 Eash et al.

OTHER PUBLICATIONS

European Patent Office, Partial European Search Report, Application No. 25218975.8, mailed Mar. 6, 2026, 16 pages.

* cited by examiner

*Primary Examiner* — Donna V Bocar
(74) *Attorney, Agent, or Firm* — Ziegler IP Law Group, LLC.

(57) ABSTRACT

A display device includes a backlight unit that is controllable to switch between lights of different colours, and an active panel including a liquid crystal (LC) layer, a linear polarizer, and a drive circuit. Sub-images of an image are displayed by employing temporal multiplexing. Different sets of drive signals are generated for respective sub-images, based on a predefined sequence in which the sub-images are to be displayed. For each sub-image, a set of drive signals is generated to individually control LC cells of the LC layer, based on intensity values of pixels in the sub-image. The LC cells are controlled individually, via the drive circuit, using the different sets of drive signals according to the predefined sequence, whilst controlling the backlight unit to switch between lights of different colours according to the predefined sequence in which the sub-images are to be displayed.

20 Claims, 3 Drawing Sheets

DISPLAY DEVICE WITH BACKLIGHT UNIT HAVING SWITCHABLE MULTI-COLOURED LIGHTSOURCES

TECHNICAL FIELD

The present disclosure relates to display devices employing temporal multiplexing with multi-coloured backlight units. The present disclosure also relates to systems for displaying images, by using such display devices. The present disclosure further relates to methods for displaying images, by using such display devices.

BACKGROUND

Heads-up displays (HUDs) that project images onto vehicle windshields or other transparent surfaces, such as windows, must operate effectively across a wide range of lighting conditions, from bright daylight to dimly-lit night-time environments. A particularly challenging situation arises under extremely bright outdoor conditions, such as when ambient light intensity averages between 10,000 lux and 25,000 lux. This challenge is even more pronounced in aviation HUDs, where aircraft spend most of their flight time above cloud cover in direct sunlight, with light intensity reaching up to 100,000 lux.

Conventional HUDs employ multiscopic and autostereoscopic display devices along with optical combiners that are integrated into vehicle windshields. Such display devices commonly use multiscopic optical elements (for example, such as lenticular arrays or parallax barriers) to project distinct images to each eye of each user. An angular resolution in such a display device (namely, the smallest angular separation between two viewing directions at which distinct images can be perceived as different by a user) is primarily influenced by a horizontal resolution of the display device. For instance, in a display device using a lenticular array, each lenticular lens spans multiple pixels horizontally. When viewed from a specific angle, said lenticular lens focuses light corresponding to a single subpixel beneath it, assuming the lenticular lens forms a fully focused projection of the light; in practice, a small circle of confusion may occur, depending on a viewing distance of a given eye of a user from the display device. Consequently, the given eye perceives only one subpixel filling an entire width of the lenticular lens, while a different viewing position (for example, corresponding to another eye of the user) reveals a different subpixel or even a distinct pixel depending on the viewing distance.

For practical purposes, it is desirable to maximize the horizontal resolution of such display devices, while minimising costs. Additionally, optimizing image brightness and contrast is also desired. For autostereoscopic and multiscopic display devices, especially those using lenticular arrays, the perceived horizontal resolution is determined by the number of lenticular lenses; in this regard, each lenticular lens effectively acts as one "pixel" horizontally. In contrast, a vertical resolution of such display devices corresponds to a native resolution of the display device. This often results in significantly higher vertical dots per inch (DPI) as compared to horizontal DPI. This leads to an underutilization of vertical resolution and increased computational load, due to the imbalance between the horizontal resolution and the vertical resolution.

Moreover, light efficiency in conventional display devices that employ a colour filter array comprising colour filters of different colours (for example, such as red, green and blue colour filters) is inherently low. This is because light emanating from a light source is typically white, and each colour filter (for example, a red colour filter, a green colour filter, or a blue colour filter) filters out at least two-thirds of the light to produce light of a corresponding colour (for example, red light, green light, or blue light). This results in a substantial decrease in overall brightness.

Such a low brightness hinders the user's ability to discern fine visual details and perceive accurate colors in the displayed images, leading to eyestrain and reduced usability. This challenge is particularly critical in applications requiring clear 3D visualization, as users may struggle to interpret the visual scene effectively.

Therefore, in light of the foregoing discussion, there exists a need to overcome the aforementioned problems.

SUMMARY

The present disclosure seeks to provide a display device, a system and a method for displaying exceptionally high-resolution images, while optionally facilitating high-quality autostereoscopy and multiscopy, even in bright outdoor lighting conditions. The aim of the present disclosure is achieved by a display device employing temporal multiplexing with a multi-coloured backlight unit, as well as a system and a method for displaying images, by using such a display device, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1A:
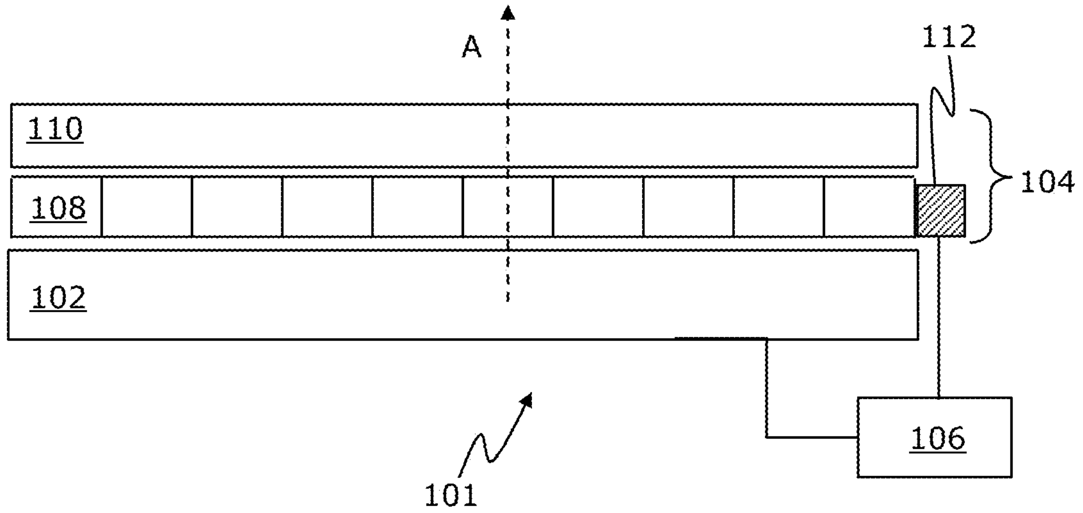
FIG. 1A is a simplified bottom view of a display device employing temporal multiplexing with multi-coloured backlight units, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display device comprising:

a backlight unit comprising a plurality of light sources that are controllable, to switch between lights of different colours;

an active panel comprising:

a liquid crystal (LC) layer comprising a plurality of LC cells;

a linear polarizer arranged on an optical path of the LC layer; and a drive circuit employed to individually control the plurality of LC cells of the LC layer; and at least one processor configured to:

obtain at least one predefined sequence in which sub-images of a given image are to be displayed via the display device, wherein each of the sub-images corresponds to a respective one of at least two different colours; and display the sub-images of the given image by employing temporal multiplexing, wherein when displaying the sub-images of the given image, the at least one processor is configured to:

generate different sets of drive signals corresponding to respective ones of the sub-images of the given image, based on the at least one predefined sequence in which the sub-images are to be displayed, wherein for a given sub-image, a corresponding set of drive signals is generated to individually control the plurality of LC cells of the LC layer, based on intensity values of pixels in the given sub-image;

send the different sets of drive signals to the drive circuit according to the at least one predefined sequence in which the sub-images are to be displayed; and control individually, via the drive circuit, the plurality of LC cells of the LC layer using the different sets of drive signals according to the at least one predefined sequence, whilst controlling the backlight unit to switch between lights of the at least two different colours according to the at least one predefined sequence in which the sub-images are to be displayed via the display device.

In a second aspect, an embodiment of the present disclosure provides a method comprising:

obtaining at least one predefined sequence in which sub-images of a given image are to be displayed via a display device, wherein the display device comprises a backlight unit comprising a plurality of light sources that are controllable to switch between lights of different colours, and an active panel comprising a liquid crystal (LC) layer comprising a plurality of LC cells, a linear polarizer arranged on an optical path of the LC layer, and a drive circuit employed to individually control the plurality of LC cells of the LC layer; and displaying the sub-images of the given image by employing temporal multiplexing, wherein each of the sub-images corresponds to a respective one of at least two different colours, wherein the step of displaying the sub-images of the given image comprises:

generating different sets of drive signals corresponding to respective ones of the sub-images of the given image, based on the at least one predefined sequence in which the sub-images are to be displayed, wherein for a given sub-image, a corresponding set of drive signals is generated to individually control the plurality of LC cells of the LC layer, based on intensity values of pixels in the given sub-image;

sending the different sets of drive signals to the drive circuit according to the at least one predefined sequence in which the sub-images are to be displayed; and controlling individually, via the drive circuit, the plurality of LC cells of the LC layer using the different sets of drive signals according to the at least one predefined sequence, whilst controlling the backlight unit to switch between lights of the at least two different colours according to the at least one predefined sequence in which the sub-images are to be displayed via the display device.

The present disclosure describes the aforementioned display device and the aforementioned method that are capable of displaying high-resolution images with exceptionally high brightness, making them particularly suitable for use in heads-up displays (HUDs), whether in two-dimensional (2D) or three-dimensional (3D) configurations, including autostereoscopic and multiscopic applications. This high resolution and brightness are achieved through a synergistic approach: the backlight unit is controlled to switch between lights of different colours following a predefined sequence, while individual LC cells in the LC layer of the active panel are independently controlled to display sub-images of a given image in synchronization with the predefined sequence. Such a synchronised operation enables each LC cell to represent a full pixel of the given image (across all its sub-images), unlike conventional display devices with colour filter arrays, where each LC cell represents only a subpixel. Consequently, the horizontal resolution of this display device is increased at least threefold compared to the conventional display devices employing red, green, and blue colour filters. Moreover, allowing each LC cell to represent a full pixel improves multiscopic isolation, eliminating colour aberrations. This also enables lower-resolution display devices to be configured more cost-effectively to display high-resolution images.

Additionally, the overall brightness of the display is also enhanced by a factor of three or more. First, an absence of a colour filter array means that the light emitted by the backlight unit is not filtered unnecessarily, preserving the light efficiency at each LC cell. This means that the light passing through each LC cell is at least three times brighter, compared to the conventional display devices. Most importantly, this improvement is achieved without increasing power consumption, compared to the conventional display devices. Second, as all neighbouring LC cells allow light of a same colour to pass through simultaneously (instead of different colours, as is the case in the conventional display devices), a potential emission area for the light of the same colour increases at least threefold, further amplifying the overall brightness by an additional factor of three.

Pursuant to the present disclosure, the aforementioned display device is suitable to be implemented in an HUD. However, it will be appreciated that the aforementioned display device is not limited to be implemented in an HUD only, and can also be implemented for other types of displays. Examples of the other types of displays include, but are not limited to, infotainment displays (for example, such as dashboard or rear-seat screens in vehicles for entertainment, navigation, or system control), instrument clusters (for example, such as digital or hybrid instrument panels showing speed, fuel levels, and other vehicle metrics), augmented-reality (AR) glasses, extended-reality (XR) headsets, smartphone displays, interactive kiosks, digital signage, medical imaging displays, and wearable devices (for example, such as displays on smartwatches, fitness trackers, or other personal devices).

In a third aspect, an embodiment of the present disclosure provides a system comprising:

tracking means;

a display device according to the aforementioned first aspect;

a multiscopic optical element arranged on an optical path of the display device; and at least one processor configured to:

determine a relative location of a first eye and of a second eye of at least one user with respect to an image plane of the display device, by utilising the tracking means, wherein the given image is a light field image that is generated or retrieved based on the relative location of the first eye and of the second eye of the at least one user with respect to the image plane; and control the multiscopic optical element, based on the relative location of the first eye and of the second eye of the at least one user with respect to the image plane, to direct light corresponding to a first set of pixels and a second set of pixels of the light field image to produce a first part and a second part of a synthetic light field, respectively, for the first eye and the second eye of the at least one user.

The present disclosure also describes the aforementioned system for displaying images, by using the aforementioned display device. This makes the system suitable to be implemented as an HUD. In this regard, the system may be implemented as a 2D HUD or a 3D HUD facilitating autostereoscopic and multiscopic applications. The system is capable of producing an exceptionally-bright synthetic light field presenting high-resolution images, due to the aforementioned synergistic approach of controlling the backlight unit to switch between the lights of the different colours following the predefined sequence, while controlling the individual LC cells in the LC layer of the active panel to display the sub-images of the given image in synchronization with the predefined sequence. This allows for presenting virtual content legibly, even in bright outdoor lighting conditions (for example, when the average intensity of ambient light lies in a range of 10,000 lux to 100,000 lux) and even with a relatively wide field of view (for example, in a range of 20 degrees×20 degrees to 60 degrees×25 degrees, or even more) of the display device. As a result, it minimises eyestrain and enhances the system's usability, allowing users to effortlessly perceive 3D visual scenes displayed by the system.

For illustration purposes, there will now be described how the display device works to achieve the aforementioned technical benefits. Various components of the display device operate as follows:

(1) In operation, the at least one processor obtains the at least one predefined sequence in which the sub-images of the given image are to be displayed. By "obtaining", it is meant that the at least one predefined sequence could be either retrieved or determined (namely, selected) based on certain predefined criteria, for example, as described later in detail.

(2) Each of the sub-images corresponds to a respective one of the at least two different colours. These sub-images may be retrieved from a data repository (communicably coupled to the at least one processor) where they are pre-stored. Alternatively, these sub-images may be generated by the at least one processor, during operation, by separating colour channels of the given image. As an example, for an image that is represented in the RGB colour model (based on three colours-red, green and blue), each pixel of the given image is described by three values: an intensity value of red colour, an intensity value of green colour, and an intensity value of blue colour. These three values are stored for all the pixels of the given image in respective ones of three separate channels. In other words, each channel represents intensity values of a respective one of the three colours for the pixels of the given image. Sub-images of respective ones of the three colours are then generated by extracting the separate channels from the given image. A red channel includes the intensity values of the red colour; likewise, a green channel includes the intensity values of the green colour; similarly, a blue channel includes the intensity values of the blue colour. A sub-image corresponding to the red colour can be generated by combining the red channel with zero intensity values for the green channel and the blue channel, thereby creating a monochromatic sub-image for the red colour. Likewise, a sub-image corresponding to the green colour can be generated by combining the green channel with zero intensity values for the red channel and the blue channel, thereby creating a monochromatic sub-image for the green colour. Similarly, a sub-image corresponding to the blue colour can be generated by combining the blue channel with zero intensity values for the red channel and the green channel, thereby creating a monochromatic sub-image for the blue colour.

It is worth noting that, compared to a conventional display device where colour filters of primary colors are arranged side-by-side horizontally (for example, in a sequence such as "R G B R G B R G B R G B . . . "), the given image (for which the sub-images are generated) achieves a horizontal resolution that is at least three times higher than that of a conventional image displayed on the conventional display device. This is because, in a conventional image, three sub-pixels arranged consecutively along a horizontal axis represent a single pixel.

(3) In order to display the sub-images via the display device, the different sets of drive signals corresponding to respective ones of the sub-images are generated based on the at least one predefined sequence in which the sub-images are to be displayed. Continuing from the above example, the at least one predefined sequence could be any one of the following:

(a) RGB
(b) G B R
(c) BR G
(d) R B G
(e) B G R
(f) GR B

For example, in case of (a) "R G B", the sub-images are to be displayed in the following order: the red sub-image, the green sub-image, the blue sub-image. In such a case, the different sets of drive signals can be generated such that a set of drive signals corresponding to the red sub-image is generated first, a set of drive signals corresponding to the green sub-image is generated next, and a set of drive signals corresponding to the blue sub-image is generated thereafter. This applies similarly for other example predefined sequences (b), (c), (d), (e) and (f). Generating drive signals for controlling individual ones of the plurality of LC cells based on the intensity values of the pixels is well-known in the art.

(4) The different sets of drive signals are then sent to the drive circuit according to the at least one predefined sequence in which the sub-images are to be displayed. For example, in case of (a) "R G B", the set of drive signals corresponding to the red sub-image is sent first, the set of drive signals corresponding to the green sub-image is sent next, and the set of drive signals corresponding to the blue sub-image is sent thereafter.

(5) To display a given sub-image, the drive circuit controls the LC cells of the LC layer using a corresponding set of drive signals, while the backlight unit is controlled to emit light of a corresponding colour. Continuing from the above example, when the backlight emits the red light, the drive circuit controls the LC cells using the set of drive signals corresponding to the red sub-image. Likewise, when the backlight emits the green light, the drive circuit controls the LC cells using the set of drive signals corresponding to the green sub-image. Similarly, when the backlight emits the blue light, the drive circuit controls the LC cells using the set of drive signals corresponding to the blue sub-image. When these sub-images are displayed in quick succession by employing temporal multiplexing, the three colours are additively mixed and perceived as the given image, which has an exceptionally high resolution and brightness.

It will be appreciated that the display device is not limited to an additive colour model (having red, green and blue colours), and can be implemented similarly for a subtractive colour model (having cyan, magenta, yellow and white colours). Various embodiments of the present disclosure have been described with reference to the additive colour model, for the sake of convenience. A person skilled in the art would recognise that the various embodiments can be implemented similarly using the subtractive colour model as well.

The aforementioned steps of generating and sending the different sets of drive signals and the aforementioned steps of controlling the plurality of LC cells, whilst controlling the backlight are performed for a plurality of images. It will be appreciated that when the plurality of images are displayed sequentially via the display device, it is not necessary to use the same predefined sequence (namely, the at least one predefined sequence) for sub-images of each image. In other words, sub-images of different images can be displayed using different predefined sequences. Optionally, in this regard, the at least one processor is configured to display sub-images of another given image by employing temporal multiplexing, wherein the sub-images of the another given image are displayed according to at least one another predefined sequence, the at least one another predefined sequence being different from the at least one predefined sequence employed for the given image.

Accordingly, the step of generating different sets of drive signals, the step of sending the different sets of drive signals to the drive circuit, and the step of controlling the plurality of LC cells, whilst controlling the backlight unit are performed based on the at least one another predefined sequence. It is worth noting that the number of sub-images of the another given image may or may not be the same as the number of sub-images of the given image. As an example, the given image may have three sub-images: a red sub-image, a green sub-image and a blue sub-image, while the another given image may have two sub-images: a red sub-image and a green-sub-image. In such a case, a predefined sequence that is used for displaying the sub-images of the given image may be: R G B, while another predefined sequence that is used for displaying the sub-images of the another given image may be: R G. As another example, the given image may have three sub-images (of red, green and blue colours), while the another given image may have four sub-images: a red sub-image, a green-sub-image, a blue sub-image and a yellow sub-image. In such a case, a predefined sequence that is used for displaying the sub-images of the given image may be: R G B, while another predefined sequence that is used for displaying the sub-images of the another given image may be: R G B Y. Notably, a given sub-image is not restricted to primary colours, and could also represent non-primary colours.

A technical benefit of using different predefined sequences for different images is that it allows for balancing between brightness and colour reproduction accuracy. As an example, the display device can switch between two predefined sequences: R G B W and R G B G. The two predefined sequences can be employed in an alternating pattern as follows:

RGBW RGBG RGBW RGBG . . .

However, the two predefined sequences can alternatively be employed in any other pattern, for example, as follows:

RGBW RGBW RGBG RGBW RGBW RGBG . . .

Moreover, as the human fovea is relatively less sensitive to the blue colour compared to other colours, blue sub-images can be skipped for some images. As an example, blue sub-images can be skipped for every $N^{th}$ image (for example, $2^{nd}$).

Furthermore, using different predefined sequences for different images also allows for optimising the display device for various use cases. This optimisation can be based on various factors, for example, such as one or more of: colours present in the images, an ambient light intensity during display of the images, whether an emergency notification is to be presented.

Optionally, in this regard, the at least one predefined sequence in which the sub-images of the given image are to be displayed is obtained based on colours of at least one virtual object being presented by the given image. A technical benefit of obtaining the at least one predefined sequence in this manner is that it enhances the visual accuracy and fidelity of the at least one virtual object, ensuring its colours are rendered with greater precision. This also allows for optimising the brightness and contrast of the displayed image, particularly in scenarios where specific colors dominate over others, or are critical to the image's clarity.

Moreover, it can also reduce power consumption by allowing selection of sub-images that align with dominant colours of the at least one virtual object, thereby limiting the number of sub-images and hence the activation of unnecessary backlight components.

As an example, for a virtual object that is a yellow sunflower, a red sub-image and a green sub-image may be selected for accurate representation the yellow sunflower. In such a case, a blue sub-image may not be necessary, unless required for specific highlights or background blending. As another example, for a virtual object that is an orange pumpkin, a red sub-image may be selected for the dominant hue, while a green sub-image may be selected for modulation of the colour. In such a case, a blue sub-image may not be needed, unless required for background blending or lighting effects.

Additionally, optionally, the at least one predefined sequence is obtained based further on the ambient light intensity during display of the given image. This allows for improving viewer comfort and image visibility under varying ambient lighting conditions, tailoring the display output to better match the real-world environment in which the display device is being used. This ensures that a consistent and comfortable viewing experience is provided to the user, regardless of external conditions. Additionally, it enhances usability in applications like HUDs, other automotive displays, outdoor signage, or portable devices where lighting conditions can vary significantly.

As an example, in a case where the yellow sunflower (namely, the virtual object) is to be presented in a bright daylight environment, intensity values of the red sub-image and the green sub-image can be increased to achieve a vibrant yellow, while the blue sub-image can be skipped. In another case where the yellow sunflower is to be presented in a dimly-lit nighttime environment, the intensity values of the red sub-image and the green sub-image can be decreased to suit relatively softer ambient light, while the blue sub-image can be employed for background blending.

Moreover, it will be appreciated that different predefined sequences can be used for different regions of the given image. This can be achieved in implementations where the backlight unit is colour-adjustable on a per-region basis. A given region of the backlight unit could correspond to a single pixel or a group of neighbouring pixels. Implementation details of such a backlight unit have been provided later.

Optionally, in the implementations where the backlight unit is colour-adjustable on the per-region basis, the at least one predefined sequence comprises at least two different predefined sequences, wherein when obtaining the at least one predefined sequence, the at least one processor is configured to obtain the at least two different predefined sequences to be employed for respective ones of at least two different regions of the given image, based on colours of different parts of the at least one virtual object being presented respectively by the at least two different regions of the given image. As an example, if a part of the at least one virtual object has red colour only, a corresponding region of the backlight unit can be controlled to produce red light when different sub-images of the given image are displayed. This allows to display that part of the at least one virtual object with enhanced brightness. As another example, if another part of the at least one virtual object corresponds to red and blue colours only, another corresponding region of the backlight unit can be controlled to switch between red light and blue light.

A key technical benefit of employing different predefined sequences for different regions of the given image based on the colours of different parts of a virtual object (and/or different virtual objects) in those regions is that it allows for achieving superior visual performance, while optimising energy use and adapting dynamically to the different parts of the virtual object(s). These technical benefits manifest in several ways.

First, by tailoring the predefined sequence for each region of the given image based on the colours of a corresponding part of the at least one virtual object in that region, precise colour rendering can be achieved across the given image. This ensures that the different parts of the at least one virtual object retain their intended hues without any distortion. As an example, for an image of a sunset, a region representing the sky (dominated by red and orange hues) could use a predefined sequence having a red sub-image and a green sub-image, while another region representing a water body (dominated by blue and cyan hues) could use another predefined sequence having a blue sub-image and a green sub-image.

Second, different regions of the display device use only the necessary sub-images for the dominant colors in those regions, reducing power consumption. This also reduces unnecessary processing of colour channels that do not contribute significantly to a colour of a given region, thereby improving efficiency.

Third, adjusting the predefined sequence for each region allows to adapt the brightness and contrast to the colour distribution, ensuring better visibility and dynamic range. This also prevents oversaturation or harsh brightness variations, resulting in a more natural and comfortable viewing experience.

Fourth, this further allows for adjusting the predefined sequences of the different regions independently to adapt to ambient lighting conditions, thereby enhancing clarity and reducing glare or dimness.

Fifth, this allows for seamless representation of multi-coloured virtual objects, as each region of the at least one virtual object can be rendered with high fidelity. As an example, for an image of a parrot, a head region (having green feathers) could use a green-dominant sequence, a tail region (having blue feathers) could use a blue-dominant sequence, and a beak region (having an orange beak) could use a mix of a red sub-image and a green sub-image.

Moreover, optionally, in the implementations where the backlight unit is colour-adjustable on the per-region basis, the at least one predefined sequence comprises a first predefined sequence and a second predefined sequence, wherein the at least one processor is configured to:

obtain information indicative of a gaze direction of a user; and determine a first region and a second region of the given image, based on the gaze direction of the user, wherein the second region surrounds the first region, wherein when obtaining the at least one predefined sequence, the at least one processor is configured to obtain the first predefined sequence and the second predefined sequence to be employed for the first region and the second region of the given image, respectively.

The information indicative of the gaze direction of the user can be obtained by employing gaze tracking. Gaze tracking is well-known in the art. The first region is essentially a gaze region of the given image, where the user's attention is focused. The second region is a peripheral region that surrounds the gaze region. It will be appreciated that in autostereoscopic implementations, the aforementioned steps can be performed for each individual one of a plurality of users, because different pixels are employed to produce light for different users.

A key technical benefit of employing different predefined sequences for the first region and the second region (namely, a gaze region and a peripheral region, respectively) is that it allows to achieve superior visual performance where it matters most, while optimizing power usage, reducing eye strain, and enhancing the overall user experience. These technical benefits manifest in various ways.

First, the gaze region, where the user's attention is focused, can use a predefined sequence optimised for better colour accuracy and sharpness, to deliver the best possible image quality. The gaze region could also use a predefined sequence that excludes the blue sub-image, as the human fovea is relatively insensitive to blue light.

Second, the peripheral region, which is less critical to the user's perception, can use a simplified sequence with relatively fewer sub-images, lowering energy consumption without noticeably affecting the overall viewing experience.

Third, by using different sequences in the gaze region and the peripheral region, processing power and display resources can be allocated more efficiently, focusing on the gaze region, while minimizing computation in the peripheral region.

Fourth, the predefined sequence used for the gaze region can be adjusted according to the ambient light for improved clarity and comfort, while the peripheral region can use a dimmer sequence to minimize glare or distractions.

Fifth, the predefined sequence used for the gaze region can be tailored to emphasize the gaze region, for example, for highlighting critical virtual content, while de-emphasizing less important virtual content in the peripheral region. Additionally, by employing relatively brighter, more vivid sequences in the gaze region and relatively subtler sequences in the peripheral region, a natural contrast can be created to enhance a perception of depth and focus.

Furthermore, optionally, in the implementations where the backlight unit is colour-adjustable on the per-region basis, the at least one processor is configured to:

- detect when a region of a next image is to present an emergency notification to a user; and
- when it is detected that the region of the next image is to present the emergency notification to the user,
  - determine a region of the backlight unit that corresponds to said region of the next image;
  - control said region of the backlight unit to produce light of a same colour, whilst controlling a remaining region of the backlight unit to switch between lights of at least two different colours according to a corresponding predefined sequence in which the sub-images of the next image are to be displayed via the display device;
  - generate a same set of drive signals for respective regions of the sub-images of the next image that correspond to said region of the next image, whilst generating different sets of drive signals for respective ones of remaining regions of the sub-images of the next image, based on the corresponding predefined sequence in which the sub-images are to be displayed; and
  - send, to the drive circuit, the same set of drive signals for said respective regions of the sub-images of the next image, and the different sets of drive signals for the respective ones of said remaining regions of the sub-images of the next image according to the corresponding predefined sequence in which the sub-images are to be displayed.

Such detection of the region of the next image that is to present the emergency notification can be made based on information received from one or more of: (i) onboard diagnostics of a vehicle, (ii) vehicle sensors, (iii) a navigation system of the vehicle, (iv) lane detectors in the vehicle. As an example, the onboard diagnostics may provide information indicating the current status of the vehicle's instrumentation, for example, such as critical system warnings pertaining to engine failure, low fuel, or tire pressure issues. As another example, in case of the vehicle sensors, proximity sensors could provide information indicating a potential collision, temperature sensors could provide information indicating engine overheating, a battery monitoring sensor could provide information indicating low charge in an electric vehicle, a rain or fog sensor could provide information indicating an alert for reduced visibility, and so on. As yet another example, the navigation system could provide information indicating sharp turns, upcoming hazards, or wrong-way driving. As still another example, the lane detectors could provide information indicating a lane departure. Moreover, such detection can also be made by employing driver monitoring (based on eye tracking), which can be utilised to detect a driver's gaze to determine where emergency notifications are most likely to be seen.

The region of the next image that is to present the emergency notification can be determined based on the aforementioned information and/or the driver's gaze. Correspondingly, the region of the backlight unit that corresponds to said region of the next image can also be determined.

The same set of drive signals are used to control LC cells for said respective regions of the sub-images of the next image, in synchronisation with controlling of said region of the backlight unit to produce the light of the same colour. Simultaneously, the different sets of drive signals are used to control other LC cells for the respective ones of said remaining regions of the sub-images of the next image according to the corresponding predefined sequence in which the sub-images are to be displayed, in synchronisation with controlling the remaining region of the backlight unit to switch between the lights of the at least two different colours according to the corresponding predefined sequence.

A key technical benefit of this is that it allows for achieving a balance between delivering high-visibility emergency notifications, while maintaining optimal performance for the remaining regions of the sub-images. This ensures effective communication of critical alerts, while preserving overall display functionality and user experience. These technical benefits manifest in several ways.

First, by controlling the backlight unit in the region displaying the emergency notification to produce light of the same colour consistently, the emergency notification becomes more visually prominent, ensuring it captures the user's attention effectively. This also making it easier for users to focus on critical alerts without being overwhelmed by complex or inconsistent visuals. As an example, a red emergency alert in a navigation interface can be illuminated with a consistent red backlight, making it stand out from the rest of the given image where predefined colour sequence(s) are used.

Second, generating the same set of drive signals for the region displaying the emergency notification ensures that the emergency notification is rendered with high consistency and precision, minimising visual artifacts or inconsistencies that could distract or confuse the user. As an example, a flashing red alert displayed on an HUD remains stable and vibrant, even when surrounding regions of the HUD are rendering dynamic content like maps or instrument gauges.

Third, by maintaining the corresponding predefined sequence and distinct drive signals for other regions of the sub-images, non-emergency content remains visually coherent and undisturbed, preserving the overall user experience.

Fourth, it also creates a clear contrast between the emergency notification and the surrounding regions, making the emergency notification more distinguishable from other virtual content.

Fifth, the consistent backlight colour for the emergency notification ensures that critical notifications remain visible and distinct, even in challenging ambient light conditions.

Alternatively, optionally, the at least one processor is configured to:

- detect when at least a region of a next image is to present an emergency notification to a user; and
- when it is detected that at least the region of the next image is to present the emergency notification to the user, control the backlight unit to produce light of a same colour for sub-images of the next image;

generate a same set of drive signals for the sub-images of the next image, to individually control the plurality of LC cells of the LC layer according to intensity values of pixels in one of the sub-images that corresponds to the same colour;

send the same set of drive signals to the drive circuit for the sub-images of the next image; and control individually, via the drive circuit, the plurality of LC cells of the LC layer using the same set of drive signals, whilst the backlight unit is controlled to produce the light of the same colour, thereby displaying the next image using the same colour.

This is particularly suitable for implementations where the backlight unit is not colour-adjustable on the per-region basis. A technical benefit of leveraging uniform backlight control (namely, skipping to switch colours at least temporarily) and drive signal synchronization is that it ensures emergency notifications are displayed clearly, quickly, and reliably, optimizing both user attention and system performance. These technical benefits manifest in various different ways.

First, by controlling the backlight unit to produce the light of the same colour for the sub-images and synchronizing it with the same set of drive signals for multiple sub-images, the emergency notification becomes more prominent, ensuring it captures the user's attention effectively.

Moreover, displaying emergency notifications in a uniform colour simplifies visual processing, allowing users to recognize and respond to critical alerts faster. As an example, a consistent red backlight with synchronized LC cell control ensures that a critical alert on an HUD is immediately noticeable.

Second, using the same set of drive signals for all sub-images reduces the complexity of signal generation and processing, enhancing efficiency and reliability of the display device. Moreover, simplified signal generation and backlight control reduce the likelihood of errors or failures, making the display device more robust for critical applications. Furthermore, generating a single set of drive signals reduces latency, allowing emergency notifications to be displayed more quickly compared to rendering dynamic multi-colour images.

Third, a uniform backlight colour avoids inconsistencies or artifacts in a specific region that corresponds to the emergency notification, ensuring the message or symbol is clear and easy to read. As an example, a smartwatch could display a weather hazard notification in bright orange with even illumination, making it legible even on a small screen.

Fourth, limiting the backlight unit to a single colour and using uniform drive signals reduces energy consumption, whilst still being able to display the next image with exceptionally high brightness.

Fifth, a consistent backlight colour with synchronized LC cell control ensures high visibility, even in bright sunlight or low-light environments. As an example, in an aviation HUD, a uniform red emergency warning is clearly visible even above cloud cover in direct sunlight. It will be appreciated that different types of emergency notifications can be displayed using specific predefined colours, thereby improving response efficiency.

Pursuant to embodiments of the present disclosure, the plurality of light sources of the backlight unit can be implemented in various ways. For brevity, some of the various ways will now be described only briefly, without limiting the backlight unit to such implementations only. In a first example implementation, the plurality of light sources of the backlight unit are implemented as at least one white light source and at least one colour wheel arranged on an optical path of the at least one white light source, wherein the at least one colour wheel comprises colour filters of primary colours. In some sub-implementations, the at least one colour wheel may further comprise at least one additional colour filter of at least one secondary colour for an expanded colour gamut. The at least one white light source can be implemented as a high-intensity white LED or a laser diode. The at least one white light source acts as an initial, broad-spectrum light source in the backlight unit. The at least one colour wheel can be implemented as a rotating disk or a linear panel. The at least one colour wheel can be divided into segments of different colour filters. As an example, in the additive colour model, the different colour filters can be red, green and blue colour filters. In such an example, the at least one colour wheel can also include a colour filter of a secondary colour, for example, such as a yellow colour filter. As another example, in the subtractive colour model, the different colour filters can be cyan, magenta, yellow and white colour filters.

In operation, white light emitted by the at least one white light source passes through the at least one colour wheel that is set to rotate between the different colours, thereby allowing for sequential filtering of the white light into the different colours. In this regard, when a red colour filter lies on an optical path of white light emitted by the at least one white light source, the white light is filtered to produce red light; likewise, when a green colour filter lies on the optical path of the white light emitted by the at least one white light source, the white light is filtered to produce green light; similarly, when a blue colour filter lies on the optical path of the white light emitted by the at least one white light source, the white light is filtered to produce blue light. Thus, a combination of the at least one white light source and the red colour filter acts as one light source producing red light; a combination of the at least one white light source and the green colour filter acts as another light source producing green light; a combination of the at least one white light source and the blue colour filter acts as yet another light source producing blue light.

In operation, the filtered light is directed to the active panel, synchronized with a refresh rate of the active panel to match the timing of each colour segment. Such a synchronization ensures that each colour segment aligns accurately with a corresponding sub-image being displayed, minimal motion artifacts and ensuring sharp, vibrant images. In this regard, the backlight unit could comprise a light guide, wherein the at least one white light source and the at least one colour wheel are arranged to input light into at least one edge of the light guide. The light guide distributes the light uniformly across an entire region of the backlight unit, and directs the light towards the active panel. Additionally, optionally, the backlight unit could comprise a spread-out waveguide arranged between the light guide and the at least one colour wheel. The spread-out waveguide is employed to spread the light across the at least one edge of the light guide.

The first example implementation of the backlight unit has several technical benefits. First, the segmentation of light into primary colours (and optionally, non-primary colours) ensures more precise and vibrant colour reproduction. Second, by controlling the intensity of light for each colour channel independently, the display device can achieve deeper blacks and brighter highlights, leading to better contrast. Moreover, the backlight unit can be controlled based on the virtual content being displayed. In this regard, an intensity and timing of the at least one white light source and a rotation speed of the at least one colour wheel can be adjusted in real-time, enabling optimal performance for high dynamic range (HDR) content. Such a dynamic control allows for brighter highlights, deeper blacks, and an expanded range of colours, delivering an immersive viewing experience. Third, since the at least one colour wheel handles the separation of primary colors, the active panel does not require complex in-pixel colour filtering layers, potentially reducing cost and increasing efficiency. Fourth, it allows to use the full spectrum of the at least one white light source efficiently by sequentially filtering and directing it without significant wastage. This potentially leads to energy savings compared to conventional display devices using white backlight units.

In some sub-implementations of the first example implementation, the at least one white light source is a single light source, and the at least one colour wheel is a single colour wheel. In other sub-implementations of the first example implementation, the at least one white light source is a plurality of white light sources, and the at least one colour wheel is a plurality of colour wheels corresponding to respective ones of the plurality of white light sources. Such sub-implementations allow to produce light of secondary colours even when the colour wheels include colour filters of primary colours only. As an example, yellow light can be produced by a combination of a red light and a green light produced by separate sets of white light sources and colour wheels. This also allows for finer control of colour reproduction, and generation of a broader colour gamut. As an example, at least two separate sets of white light sources and colour wheels can be implemented, wherein one of the at least two separate sets employs a colour wheel having primary colours according to the additive colour model (for example, red, green and blue colours), while another of the at least two separate sets employs another colour wheel having primary colours according to the subtractive colour model (namely, cyan, magenta and yellow colours).

In a second example implementation, the plurality of light sources of the backlight unit are implemented as a plurality of laser light sources of primary colours, the backlight unit further comprising a light guide employed to guide light emitted by the plurality of light sources towards the active panel, wherein the plurality of laser light sources are individually controllable. Optionally, the plurality of laser light sources are arranged together as a single group in a proximity of an edge of the light guide, wherein the backlight unit further comprises a spread-out waveguide that is employed to spread the light across the edge of the light guide. A technical benefit of combining the laser light sources into the single group and utilising the spread-out waveguide is that the backlight unit can achieve high brightness with fewer laser light sources. This is possible because the laser light sources generate exceptionally bright light, which, when distributed across the edge of the light guide, illuminates an entirety of the backlight unit with high-intensity brightness.

Alternatively, optionally, the plurality of laser light sources are arranged as a plurality of groups, each group comprising at least one laser light source of each primary colour. A technical benefit of employing the plurality of groups of the laser light sources is that the overall brightness of the display device can be scaled according to a size of an area on which images are to be projected. This allows for displaying clear and vivid images to the user, without a need to compromise on the size of the area on which the images are to be projected. Additionally, optionally, at least two of the plurality of groups are arranged at different edges of the light guide. In such a case, the light guide has multiple light inlets arranged at respective ones of the different edges. Arranging the groups of the laser light sources at the different edges of the light guide has several technical benefits. First, the light enters the light guide from multiple directions, which ensures more even distribution of the light across an entirety of the light guide. This eliminates brightness gradients that might occur with light sources concentrated along a single edge. Second, using multiple edges effectively increases a total light input into the light guide, thereby enhancing the overall luminance. This also prevents dimming that could occur at areas that are farthest from a single-edge source, resulting in a more uniformly bright display. Third, light traveling long distances in the light guide (from a single-edge source) may lose intensity due to scattering and absorption. Multiple-edge sources reduce these losses by introducing light closer to distant regions. Fourth, it supports light guide designs for curved displays, whilst ensuring consistent performance. Notably, such curved displays are well-suited to be mounted on curved portions of vehicle dashboards.

In some sub-implementations of the second example implementation, at a given time instant, only the laser light source(s) of a single primary colour are active, emitting highly pure and narrow-band light. In such sub-implementations, different laser light sources of different primary colours are controlled individually to emit light of respective ones of the different primary colours in a sequential manner. In additional or alternative sub-implementations of the second example implementation, a combination of laser light sources of different primary colours can be activated simultaneously to emit light of the different primary colours, wherein the different primary colours are mixed to produce light of a secondary colour or a non-primary colour. It will be appreciated that multiple lasers with slightly different wavelengths can be employed together to produce a single primary colour. This eliminates the speckling effect caused by a diffraction pattern of a single-wavelength laser.

Moreover, each laser light source is individually controllable, enabling precise modulation of colour and intensity. In operation, the light guide (namely, a transparent or semi-transparent optical component) guides and uniformly distributes the light emitted by the laser light sources across the active panel. The sequential emission of the laser light sources is synchronised with display timings of respective ones of the sub-images. This ensures that each sub-image is illuminated by a corresponding colour light source without any overlap or delay, minimizing colour mixing and ensuring sharp transitions between colours.

The second example implementation of the backlight unit has several technical benefits. First, the lasers light sources emit highly pure, narrow-band light, enabling an exceptionally wide and accurate colour gamut. Second, due to their instantaneous response, the laser light sources can reduce motion artifacts, while providing flexibility in configuring predefined sequences in which different sub-images can be displayed. Third, the laser light sources are more efficient in converting electrical energy into light, as compared to conventional light-emitting diodes (LEDs). This facilitates high brightness levels suitable for HUDs. Fourth, independent control of lasers of different primary colours allows fine-tuning of colour balance and brightness for every sub-image. This enhances dynamic range by boosting highlights and deepening shadows. Fifth, the light guide ensures even illumination across the active panel, eliminating issues like hotspots or dim areas. This is critical for large displays where achieving uniformity is challenging. Sixth, the laser light sources are smaller than LEDs, enabling a more compact and lightweight design of the backlight unit. Seventh, the laser light sources have a longer operational lifespan and are less prone to degradation, as compared to LEDs. This increases reliability in demanding environments.

Moreover, the intensity of the laser light sources can be controlled based on the virtual content being displayed. In this regard, the intensity and timing of the laser light sources can be adjusted in real-time, enabling optimal performance for high dynamic range (HDR) content. This enhances the user's viewing experience.

In a third example implementation, the plurality of light sources of the backlight unit are implemented as an array of light-emitting elements of primary colours, wherein the light-emitting elements of said array are individually controllable. The light-emitting elements can be implemented as any one of: LEDs, mini-LEDs, micro-LEDs, organic LEDs (OLEDs). Each light-emitting element emits light of a corresponding primary colour and is individually controllable for brightness and on/off state. The array enables pixel-level or region-level modulation of colour and intensity, allowing dynamic lighting adjustments for specific regions of a sub-image (and eventually an image being displayed). The light-emitting elements are controlled individually according to the at least one predefined sequence in which the sub-images are being displayed. Such independent control of the light-emitting elements allow for creation of non-primary colours through simultaneous activation of light-emitting elements of different primary colours.

The third example implementation of the backlight unit has many technical benefits. First, individual control of light-emitting elements allows precise local dimming, where only the necessary portions of the array are illuminated. This results in improved contrast and energy efficiency, especially in HDR content. Second, the use of primary colours (namely, red, green and blue colours) ensures accurate colour reproduction. Third, colour and intensity adjustments can be made on a per-region basis based on the virtual content, ensuring optimal brightness and colour fidelity for every sub-image. For an HDR image, the array can selectively illuminate bright areas while maintaining deep shadows, enhancing contrast and dynamic range. This also reduces eye strain by allowing for adaptation to ambient lighting. Fourth, by illuminating only certain regions, unnecessary power usage can be minimised, extending the lifespan of the display device and reducing energy consumption. Fifth, the individual control of light-emitting elements ensures smooth transitions and avoids flicker, even in high-refresh-rate applications. Notably, high refresh rates can be achieved due to the rapid response time of the light-emitting elements. This is highly beneficial for temporal multiplexing. Sixth, arrays of micro-LEDs or mini-LEDs enable ultra-thin backlight units suitable for slim displays while maintaining scalability for different screen sizes. This is critical for space-constrained environments, for example, such as HUDs.

Optionally, in the third example implementation, a given sub-image of the given image corresponds to one of the primary colours, wherein when displaying the given sub-image, the at least one processor is configured to:

activate light-emitting elements of the one of the primary colours in at least a region of said array, to produce light of the one of the primary colours at full brightness; and simultaneously, activate a first predefined percent of light-emitting elements of at least one other of the primary colours in at least said region of said array, to produce light of the at least one other of the primary colours at a second predefined percent of full brightness.

Such a simultaneous activation allows for increased overall brightness of the given sub-image, enabling extra-bright HDR rendering. As an example, HDR rendering can be provided for a gaze region only; in such a case, said region can be selected based on the user's gaze. Beneficially, the first predefined percent of the light-emitting elements of the at least one other of the primary colours can be distributed uniformly in said region. By "at least said region", it is meant that the simultaneous activation can also be performed for an entirely of the array.

In particular, light-emitting elements of different colours can be activated simultaneously, instead of switching between the activation of red light-emitting elements, green light-emitting elements and blue light-emitting elements to display a red sub-image, a green sub-image and a blue sub-image, respectively. For example, when displaying a red sub-image, the red light-emitting elements can be fully illuminated, while the first predefined percent of the green light-emitting elements and/or the blue light-emitting elements can be illuminated either at their maximum brightness or at a fraction of their maximum brightness.

The second predefined percentage may differ from the first predefined percentage, allowing flexible control over the contribution of secondary colours. It will be appreciated that when the light-emitting elements of the at least one other of the primary colours are illuminated at the fraction of their maximum brightness, the second predefined percent is smaller than the first predefined percent. Otherwise, when the light-emitting elements of the at least one other of the primary colours are illuminated at their maximum brightness, the second predefined percent is same as the first predefined percent. The second predefined percentage may, for example, be 50 percent or less. The first predefined percentage and the second predefined percent can be dynamically adjusted in real-time based on the virtual content being displayed. For example, brighter scenes may use higher percentages for secondary colours to maximize brightness, while darker or colour-critical scenes may prioritize colour accuracy.

While the light of the one of the primary colours is produced at full brightness (namely, 100 percent of the maximum brightness), the light of the at least one other of the primary colours is produced at the second predefined percent of full brightness (for example, 40 percent of the maximum brightness). This increases the overall brightness of the given sub-image (and consequently, the given image so displayed) at the cost of reduced colour saturation. The term "full brightness" refers to 95 percent or more of the maximum brightness that is possible. Notably, such a simultaneous activation can be performed while carefully balancing the trade-off between achieving higher overall brightness and maintaining colour saturation, enabling tailored optimization for different use cases, such as vivid daytime scenes versus dim nighttime scenes.

Most importantly, this can be done on a per-region basis, as the backlight unit supports localized brightness control, enhancing flexibility and performance for HDR content. In scenes with mixed lighting conditions (for example, bright highlights alongside dark shadows), the light-emitting elements can be activated simultaneously at varying predefined percentages across different regions. This ensures that bright regions gain extra luminance, while darker regions retain their depth and colour fidelity.

It is worth noting that the simultaneous activation of multiple primary colours for a given sub-image is compatible with temporal multiplexing, ensuring smooth transitions and flicker-free operation even at high refresh-rates. Moreover, in an automotive HUD displaying critical information in a bright daylight, the simultaneous activation can increase visibility by boosting overall brightness without compromising the clarity of colour-coded emergency alerts.

Moreover, optionally, in the third example implementation, another given sub-image of the given image corresponds to a non-primary colour that corresponds to additive mixing of a first primary colour and a second primary colour, wherein when displaying the another given sub-image, the at least one processor is configured to:

- activate light-emitting elements of the first primary colour in at least a region of said array, to produce light of the first primary colour; and
- simultaneously, activate light-emitting elements of the second primary colour in at least said region of said array, to produce light of the second primary colour.

Said region could be selected based on a part of a virtual object having said non-primary colour. By "at least said region", it is meant that the simultaneous activation can also be performed for an entirely of the array.

It will be appreciated that the intensity of the non-primary colour can be modulated by at least one of:

- controlling individually LC cells of the LC layer corresponding to said region;
- adjusting first illumination intensities of the light-emitting elements of the first primary colour and second illumination intensities of the light-emitting elements of the second primary colour.

Notably, the LC cells of the LC layer can be controlled individually at a given time instant for both the first primary colour and the second primary colour, because the light of the first primary colour and the light of the second primary colour are being emitted simultaneously.

Activating light-emitting elements of two primary colours simultaneously to display a sub-image corresponding to a non-primary colour provides several technical benefits. First, it enables precise additive mixing, allowing accurate representation of non-primary colours (for example, yellow from red and green, cyan from green and blue, or magenta from red and blue). Second, combining light from two primary colours increases the overall luminance of the non-primary colour sub-image, making it suitable for HDR displays and environments requiring high brightness, such as outdoor or automotive applications. Third, compared to approximating non-primary colours through sequential activation or overdriving a single colour, simultaneous activation ensures balanced brightness levels and reduced risk of oversaturation or colour distortion. Fourth, activating specific regions of the array with light-emitting elements of the first primary colour and the second primary colour ensures that mixed colours can be displayed dynamically and localized according to the virtual content. Fifth, simultaneous activation of light-emitting elements avoids the need for temporal multiplexing between colors in mixed regions, reducing flicker and ensuring smooth transitions in high-refresh-rate applications. Sixth, the ability to produce non-primary colours by combining light from existing primary colour light-emitting elements reduces the need for additional secondary colour light-emitting elements or colour filters, simplifying an overall design of the display device. Notably, this approach seamlessly integrates with existing display technologies, including LCD panels (namely, the active panel), without requiring substantial modifications to accommodate non-primary colour representation.

For illustration purposes, there will now be described how various components of the aforementioned display device and the aforementioned system can be implemented. The at least one processor of the system controls an overall operation of the system, and is communicably coupled to the tracking means, the display device and the multiscopic optical element. Optionally, the at least one processor of the system is implemented as the at least one processor of the display device. Alternatively, optionally, the at least one processor of the system is implemented as a processor of a computing device that is communicably coupled to the display device. Examples of the computing device include, but are not limited to, a laptop, a desktop, a tablet, a phablet, a personal digital assistant, a workstation, and a console. Yet alternatively, optionally, the at least one processor of the system is implemented as a cloud server (namely, a remote server) that provides a cloud computing service.

The at least one processor of the display device controls an overall operation of the display device, and is communicably coupled to the backlight unit and the active panel. The at least one processor of the display device can be implemented as any one of: a microprocessor, a controller, a microcontroller. As an example, the at least one processor of the display device can be implemented as a reduced instruction set computer (RISC) microprocessor, an application-specific integrated circuit (ASIC) microprocessor, or similar.

Various example implementations of the backlight unit have been provided earlier. In operation, the plurality of LC cells of the LC layer are controlled individually by the drive circuit using the drive signals, to adjust a polarization of light passing therethrough. This allows for modulating the intensity of the light passing through individual ones of these LC cells.

Moreover, optionally, the backlight unit is configured to emit light having a polarization orientation that is different from a polarization orientation of the linear polarizer of the active panel. In such implementations, a given LC cell can be controlled by taking into consideration a difference between the polarization orientation of the emitted light and the polarization orientation of the linear polarizer. It will be appreciated that light emitted by laser light sources are typically already polarized. One example of such laser light sources is semiconductor lasers (for example, such as laser diodes). Various ways to configure the backlight unit are well-known in the art.

It will be appreciated that a technical benefit of configuring the backlight unit to emit the light having the polarization orientation that is different from the polarization orientation of the linear polarizer is that an overall brightness of the display device is enhanced, as compared to an alternative implementation where another linear polarizer is arranged to polarize an unpolarized light. This is because when unpolarized light passes through the another linear polarizer, almost 50 percent of the brightness is lost. However, when the light emitted by the backlight unit is already polarized, there is no need to employ the another linear polarizer.

Alternatively, optionally, the active panel further comprises another linear polarizer having another polarization orientation that is different from the polarization orientation of the linear polarizer, and wherein the LC layer is arranged between the linear polarizer and the another linear polarizer. Accordingly, a given LC cell can be controlled by taking into consideration a difference between the another polarization orientation of the another linear polarizer and the polarization orientation of the linear polarizer. It will be appreciated that in such implementations, various components of the display device may be arranged (along the optical path) as follows:

backlight unit→another linear polarizer→LC layer→linear polarizer

Throughout the present disclosure, the term "active panel" refers to an LC-based panel. The LC layer of the active panel is encased between a first substrate and a second substrate. At least one first electrode is deposited on the first substrate and disposed between the LC layer and the first substrate, while a plurality of second electrodes are deposited on the second substrate and disposed between the LC layer and the second substrate. The drive circuit comprises electronic circuit components for controlling respective ones of the plurality of LC cells. These electronic circuit components could be implemented as at least one of: thin-film transistor (TFT) switches, metal-oxide-semiconductor field-effect transistor (MOSFET) switches, programmable resistors, programmable inductors, programmable capacitors. The electronic circuit components are electrically connected to respective ones of the plurality of second electrodes. Each LC cell has a respective electronic circuit component that controls a voltage applied to a respective one of the plurality of second electrodes. The at least one first electrode could be electrically connected to an electrical ground or a common electrical plane.

In some implementations, the at least one user is a single user. In other implementations, the at least one user is a plurality of users. It will be appreciated that the step of determining the relative location and the step of controlling the multiscopic optical element have been described with respect to an individual one of the at least one user. This means that these steps can be performed similarly for each individual one of the at least one user (including a case of the plurality of users).

Throughout the present disclosure, the term "tracking means" refers to specialised equipment for detecting and/or following a location of eyes of a given user. The given user encompasses each individual one of the at least one user. Optionally, the tracking means is implemented as at least one tracking camera. The at least one tracking camera may comprise at least one of: at least one visible-light camera, at least one infrared (IR) camera, at least one depth camera. Examples of a given visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera. Examples of a given depth camera include, but are not limited to, a Time-of-Flight (ToF) camera, a light detection and ranging (LIDAR) camera, a Red-Green-Blue-Depth (RGB-D) camera, a laser rangefinder, a stereo camera, a plenoptic camera, a ranging camera, a Sound Navigation and Ranging (SONAR) camera. It will be appreciated that any combination of various different types of cameras (for example, such as the at least one visible-light camera, the at least one IR camera, and the at least one depth camera) may be utilised in the tracking means. When different types of images captured by the various different types of tracking cameras are utilised, a location of the user's eyes can be determined highly accurately, as results obtained from one type of image can be used to refine results obtained from another type of image. Herein, these different types of images constitute tracking data collected by the tracking means, and may be in the form of at least one of: visible-light images, IR images, depth images. It will be appreciated that the tracking means tracks the eyes of the given user with a significantly high accuracy and precision, such that an error in determining the relative location may, for example, be minimised to within a tolerance range of approximately (+/−) 8 millimetres.

As mentioned earlier, the light field image is generated or retrieved based on the relative location of the first eye and of the second eye of the at least one user with respect to the image plane of the display device. The light field image may be understood to be a 2D image comprising a plurality of pixels, wherein the first set of pixels from amongst the plurality of pixels is responsible for generating the first part of the synthetic light field that corresponds to the first eye of the at least one user, and the second set of pixels from amongst the plurality of pixels is responsible for generating the second part of the synthetic light field that corresponds to the second eye of the at least one user. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image would comprise visual information corresponding to the first eye as well as the second eye of the at least one user.

In this regard, the light field image can be generated from a first image and a second image that are to be presented to the first eye and the second eye of the at least one, respectively. In some implementations, the at least one processor of the system is configured to generate the first image and the second image from a perspective of the relative location of the first eye and of the second eye of the at least one user with respect to the image plane, by employing a 3D model of at least one virtual object. It will be appreciated that the relative location of the first eye and of the second eye with respect to the image plane indicates a viewing direction of the first eye and a viewing direction of the second eye, respectively. Therefore, the first image and the second image are generated based on these viewing directions. Hereinabove, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, and a virtual information. The term "three-dimensional model" of the at least one virtual object refers to a data structure that comprises comprehensive information pertaining to the at least one virtual object. Such a comprehensive information is indicative of at least one of: a plurality of features of the at least one virtual object or its portion, a shape and a size of the at least one virtual object or its portion, a pose of the at least one virtual object or its portion, a material of the at least one virtual object or its portion, a colour and an optical depth of the at least one virtual object or its portion. The 3D model may be generated in the form of a 3D polygonal mesh, a 3D point cloud, a 3D surface cloud, a voxel-based model, or similar. Optionally, the at least one processor is configured to store the 3D model at a data repository that is communicably coupled to the at least one processor. The data repository may be implemented as a memory of the at least one processor, a cloud-based database, or similar. In other implementations, the at least one processor is configured to obtain the first image and the second image in a form of 2D user interface (UI) elements. The 2D UI elements could pertain to, for example, a virtual navigation tool, a virtual gadget, a virtual message, a virtual entity, a virtual entertainment media, a virtual information, or similar.

In some implementations, the multiscopic optical element can be implemented as a part of the display device. In other implementations, the multiscopic optical element can be implemented as a separate element. Irrespective of whether the multiscopic optical element is implemented as a part of the display device or as a separate element, the multiscopic optical element can be implemented as a controllable lenticular array, a controllable parallax barrier, or similar. The controllable parallax barrier can be implemented as any one of: a switchable liquid crystal (LC) shutter array, a switchable LC barrier, a transparent/diffuse switchable film (for example, made of a polymer-dispersed liquid crystal (PDLC)). Controlling such multiscopic optical elements based on the relative location of the eyes is well-known in the art.

Moreover, optionally, the system further comprises an optical combiner arranged on an optical path of the display device and on an optical path of a real-world light field of a real-world environment, wherein the optical combiner is employed to reflect the first part and the second part of the synthetic light field towards the first eye and the second eye of the at least one user, whilst optically combining the real-world light field with the first part and the second part of the synthetic light field.

The optical combiner can be implemented as at least a part of a windshield or other windows of a vehicle. By "at least a part", it is meant that the optical combiner can also be implemented as an entirety of the windshield or the other windows. This allows the system to be implemented as an HUD in the vehicle. The optical combiner could be implemented as at least one of: a lens, a mirror, a semi-transparent mirror, a semi-transparent film, a semi-transparent flexible membrane, a prism, a beam splitter, an optical waveguide, a polarizer. Optionally, a tilt angle of the optical combiner with respect to the image plane of the display device lies in a range of 10 degrees and 75 degrees.

The present disclosure further relates to the method as described above. Various embodiments and variants disclosed above, with respect to the aforementioned first aspect, apply mutatis mutandis to the method.

Optionally, the method further comprises displaying sub-images of another given image by employing temporal multiplexing, wherein the sub-images of the another given image are displayed according to at least one another predefined sequence, the at least one another predefined sequence being different from the at least one predefined sequence employed for the given image. A technical benefit of using different predefined sequences for different images is that it allows for balancing between brightness and colour reproduction accuracy. Moreover, using different predefined sequences for different images also allows for optimising the display device for various use cases, as described earlier.

Optionally, the at least one predefined sequence in which the sub-images of the given image are to be displayed is obtained based on colours of at least one virtual object being presented by the given image. A technical benefit of obtaining the at least one predefined sequence in this manner is that it enhances the visual accuracy and fidelity of the at least one virtual object, ensuring its colours are rendered with greater precision. This also allows for optimising the brightness and contrast of the displayed image, particularly in scenarios where specific colors dominate over others, or are critical to the image's clarity. Moreover, it can also reduce power consumption by allowing selection of sub-images that align with dominant colours of the at least one virtual object, thereby limiting the number of sub-images and hence the activation of unnecessary backlight components.

Additionally, optionally, in implementations where the backlight unit is colour-adjustable on a per-region basis, the at least one predefined sequence comprises at least two different predefined sequences, wherein the step of obtaining the at least one predefined sequence comprises obtaining the at least two different predefined sequences to be employed for respective ones of at least two different regions of the given image, based on colours of different parts of the at least one virtual object being presented respectively by the at least two different regions of the given image. A key technical benefit of employing different predefined sequences for different regions of the given image based on the colours of different parts of a virtual object (and/or different virtual objects) in those regions is that it allows for achieving superior visual performance, while optimising energy use and adapting dynamically to the different parts of the virtual object(s), as described earlier.

Moreover, optionally, in the implementations where the backlight unit is colour-adjustable on the per-region basis, the at least one predefined sequence comprises a first predefined sequence and a second predefined sequence, wherein the method further comprises:

obtaining information indicative of a gaze direction of a user; and determining a first region and a second region of the given image, based on the gaze direction of the user, wherein the second region surrounds the first region, wherein the step of obtaining the at least one predefined sequence comprises obtaining the first predefined sequence and the second predefined sequence to be employed for the first region and the second region of the given image, respectively. A key technical benefit of employing different predefined sequences for the first region and the second region (namely, the gaze region and the peripheral region, respectively) is that it allows to achieve superior visual performance where it matters most, while optimizing power usage, reducing eye strain, and enhancing the overall user experience, as described earlier.

Furthermore, optionally, in the implementations where the backlight unit is colour-adjustable on the per-region basis, the method further comprises:

detecting when a region of a next image is to present an emergency notification to a user; and when it is detected that the region of the next image is to present the emergency notification to the user, determining a region of the backlight unit that corresponds to said region of the next image;

controlling said region of the backlight unit to produce light of a same colour, whilst controlling a remaining region of the backlight unit to switch between lights of at least two different colours according to a corresponding predefined sequence in which the sub-images of the next image are to be displayed via the display device;

generating a same set of drive signals for respective regions of the sub-images of the next image that correspond to said region of the next image, whilst generating different sets of drive signals for respective ones of remaining regions of the sub-images of the next image, based on the corresponding predefined sequence in which the sub-images are to be displayed; and sending, to the drive circuit, the same set of drive signals for said respective regions of the sub-images of the next image, and the different sets of drive signals for the respective ones of said remaining regions of the sub-images of the next image according to the corresponding predefined sequence in which the sub-images are to be displayed.

A key technical benefit of this is that it allows for achieving a balance between delivering high-visibility emergency notifications, while maintaining optimal performance for the remaining regions of the sub-images. This ensures effective communication of critical alerts, while preserving overall display functionality and user experience.

Alternatively, optionally, the method further comprises:

detecting when at least a region of a next image is to present an emergency notification to a user; and when it is detected that at least the region of the next image is to present the emergency notification to the user, controlling the backlight unit to produce light of a same colour for sub-images of the next image;

generating a same set of drive signals for the sub-images of the next image, to individually control the plurality of LC cells of the LC layer according to intensity values of pixels in one of the sub-images that corresponds to the same colour;

sending the same set of drive signals to the drive circuit for the sub-images of the next image; and controlling individually, via the drive circuit, the plurality of LC cells of the LC layer using the same set of drive signals, whilst the backlight unit is controlled to produce the light of the same colour, thereby displaying the next image using the same colour.

This is particularly suitable for implementations where the backlight unit is not colour-adjustable on the per-region basis. A technical benefit of leveraging uniform backlight control (namely, skipping to switch colours at least temporarily) and drive signal synchronization is that it ensures emergency notifications are displayed clearly, quickly, and reliably, optimizing both user attention and system performance.

Moreover, the backlight unit can be implemented in various ways. In a first example implementation, the plurality of light sources of the backlight unit are implemented as at least one white light source and at least one colour wheel arranged on an optical path of the at least one white light source, wherein the at least one colour wheel comprises colour filters of primary colours. In a second example implementation, the plurality of light sources of the backlight unit are implemented as a plurality of laser light sources of primary colours, the backlight unit further comprising a light guide employed to guide light emitted by the plurality of light sources towards the active panel, wherein the plurality of laser light sources are individually controllable. In a third example implementation, the plurality of light sources of the backlight unit are implemented as an array of light-emitting elements of primary colours, wherein the light-emitting elements of said array are individually controllable.

Optionally, in the third example implementation, a given sub-image of the given image corresponds to one of the primary colours, wherein the step of displaying the given sub-image comprises:

activating light-emitting elements of the one of the primary colours in at least a region of said array, to produce light of the one of the primary colours at full brightness; and simultaneously, activating a first predefined percent of light-emitting elements of at least one other of the primary colours in at least said region of said array, to produce light of the at least one other of the primary colours at a second predefined percent of full brightness.

Such a simultaneous activation allows for increased overall brightness of the given sub-image, enabling extra-bright HDR rendering, as described earlier. The first predefined percentage and the second predefined percent can be dynamically adjusted in real-time based on the virtual content being displayed. Most importantly, this can be done on a per-region basis, as the backlight unit supports localized brightness control, enhancing flexibility and performance for HDR content.

Moreover, optionally, in the third example implementation, another given sub-image of the given image corresponds to a non-primary colour that corresponds to additive mixing of a first primary colour and a second primary colour, wherein the step of displaying the another given sub-image comprises:

activating light-emitting elements of the first primary colour in at least a region of said array, to produce light of the first primary colour; and simultaneously, activating light-emitting elements of the second primary colour in at least said region of said array, to produce light of the second primary colour.

DETAILED DESCRIPTION OF THE DRAWINGS

FIG. 1A is a simplified bottom view of a display device 101, in accordance with an embodiment of the present disclosure. The display device 101 comprises a backlight unit 102, an active panel 104 and at least one processor, depicted as a processor 106. The active panel 104 comprises a liquid crystal (LC) layer 108 comprising a plurality of LC cells, a linear polarizer 110 arranged on an optical path of the LC layer 108, and a drive circuit 112 employed to individually control the plurality of LC cells of the LC layer 108. An arrow marked A indicates an optical path of light emitted by the backlight unit 102. The processor 106 is configured to:

obtain at least one predefined sequence in which sub-images of a given image are to be displayed via the display device 101, wherein each of the sub-images corresponds to a respective one of at least two different colours; and display the sub-images of the given image by employing temporal multiplexing, wherein when displaying the sub-images of the given image, the processor 106 is configured to:

generate different sets of drive signals corresponding to respective ones of the sub-images of the given image, based on the at least one predefined sequence in which the sub-images are to be displayed, wherein for a given sub-image, a corresponding set of drive signals is generated to individually control the plurality of LC cells of the LC layer 108, based on intensity values of pixels in the given sub-image;

send the different sets of drive signals to the drive circuit 112 according to the at least one predefined sequence in which the sub-images are to be displayed; and control individually, via the drive circuit 112, the plurality of LC cells of the LC layer 108 using the different sets of drive signals according to the at least one predefined sequence, whilst controlling the backlight unit 102 to switch between lights of the at least two different colours according to the at least one predefined sequence in which the sub-images are to be displayed via the display device 101.

Figure 1B:
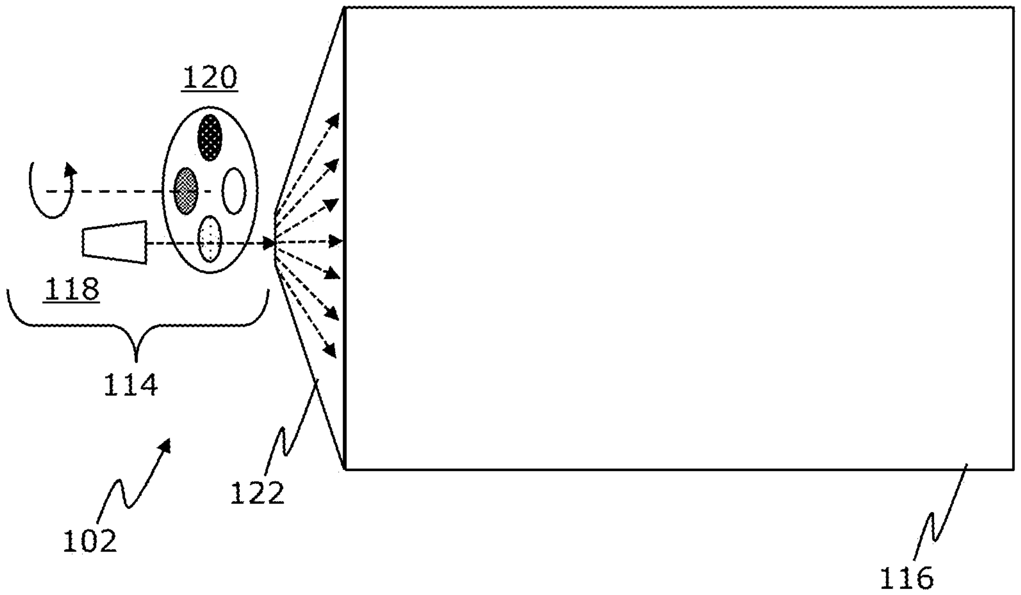
FIGS. 1B, 1C and 1D depict various different example implementations of a backlight unit of the display device, in accordance with various embodiments of the present disclosure.
Figure 1C:
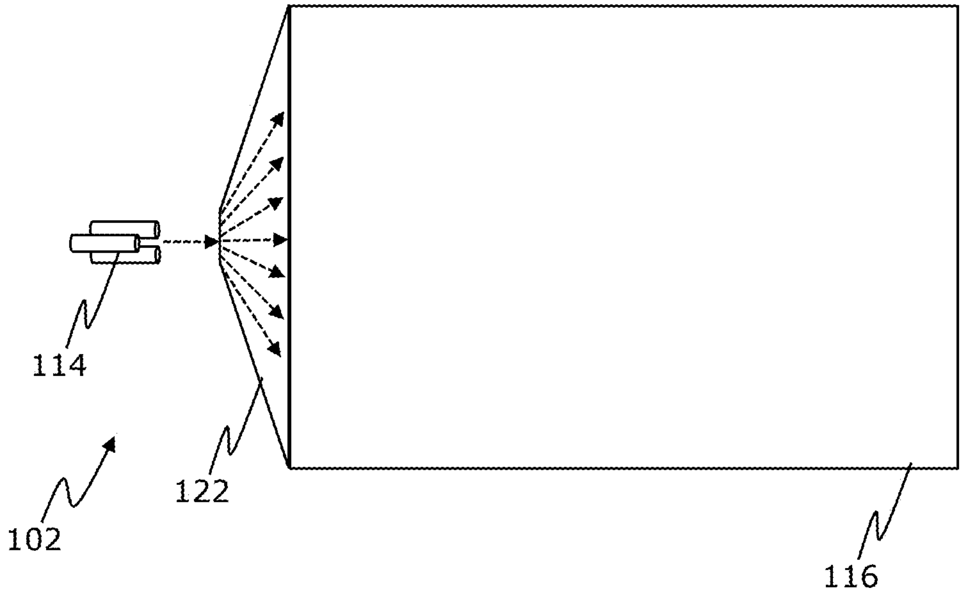
Figure 1D:
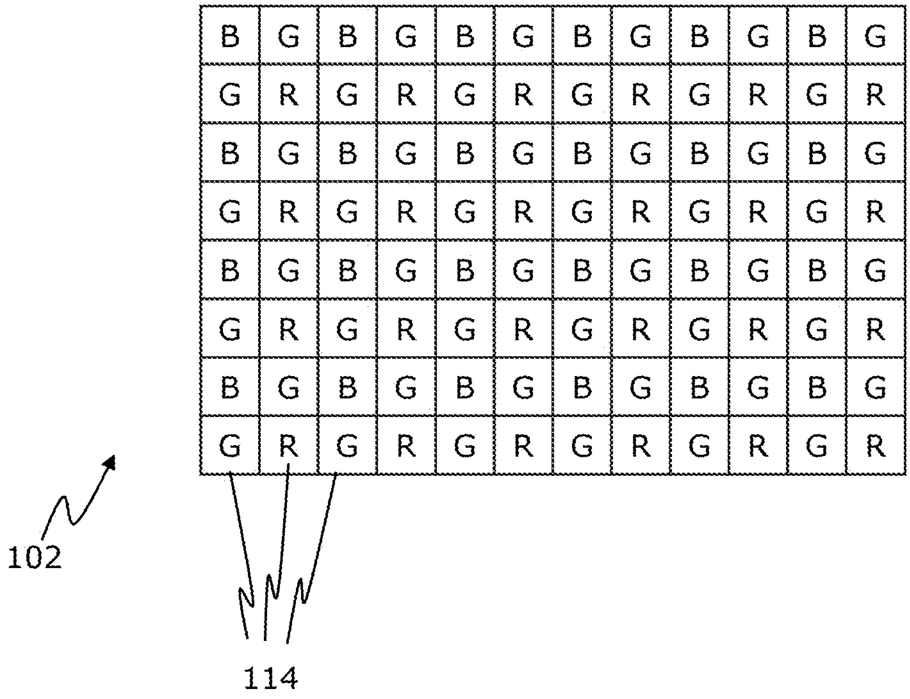

FIGS. 1B, 1C and 1D depict various different example implementations of the backlight unit 102, in accordance with various embodiments of the present disclosure. The backlight unit 102 comprises a plurality of light sources 114 that are controllable, to switch between lights of different colours.

Referring to FIG. 1B, in a first example implementation of the backlight unit 102, the plurality of light sources 114 are implemented as at least one white light source, depicted as a white light source 118, and at least one colour wheel, depicted as a colour wheel 120, arranged on an optical path of the at least one white light source. The colour wheel 120 comprises colour filters of primary colours. Optionally, the colour wheel 120 further comprise at least one additional colour filter of at least one secondary colour. Different colour filters have been depicted with different patterns in FIG. 1B. Optionally, the backlight unit 102 further comprises a light guide 116, wherein the white light source 118 and the colour wheel 120 are arranged to input light into at least one edge of the light guide 116. The light guide 116 distributes the light uniformly across an entire region of the backlight unit 102, and directs the light towards the active panel 104. Additionally, optionally, the backlight unit 102 comprises a spread-out waveguide 122 arranged between the light guide 116 and the at least one colour wheel 120. The spread-out waveguide 122 is employed to spread the light across the at least one edge of the light guide 116.

Referring to FIG. 1C, in a second example implementation of the backlight unit 102, the plurality of light sources 114 are implemented as a plurality of laser light sources of primary colours, the backlight unit 102 further comprising a light guide 116 employed to guide light emitted by the plurality of light sources 114 towards the active panel 104, wherein the plurality of laser light sources are individually controllable. Optionally, the plurality of laser light sources are arranged together as a single group in a proximity of an edge of the light guide 116, as shown, and the backlight unit 102 further comprises a spread-out waveguide 122 that is employed to spread the light across the edge of the light guide 116. Alternatively, optionally, the plurality of laser light sources are arranged as a plurality of groups, each group comprising at least one laser light source of each primary colour.

Referring to FIG. 1D, in a third example implementation of the backlight unit 102, the plurality of light sources 114 are implemented as an array of light-emitting elements of primary colours R, G and B, wherein the light-emitting elements of said array are individually controllable. It will be appreciated that the primary colours have been shown as the red colour R, the green colour G and the blue colour B, for illustration purposes only. The primary colours can alternatively be cyan, magenta and yellow colours in case of a subtractive colour model. It will also be appreciated that an example arrangement of the light-emitting elements of the primary colours R, G and B has been shown for illustration purposes only; there can be other alternative arrangements of the light-emitting elements.

It may be understood by a person skilled in the art that FIGS. 1A-1D merely depict various example implementations of the display device 101, for sake of clarity, which should not unduly limit the scope of the claims herein. It is to be understood that the specific implementation of the display device 101 is not to be construed as limiting it to specific numbers or types of backlight units, light sources, active panels, light guides, and processors. The person skilled in the art will recognize many variations, alternatives, and modifications of embodiments of the present disclosure.

Figure 1E:
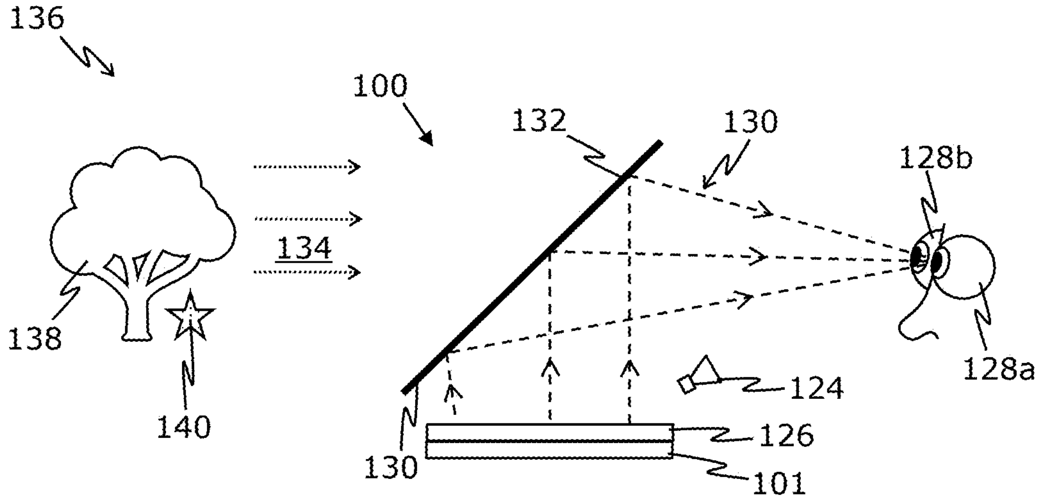
FIG. 1E depicts an exemplary environment in which a system for displaying images, by using the display device, can be employed, in accordance with an embodiment of the present disclosure.

Referring to FIG. 1E, illustrated is an exemplary environment in which a system 100 for displaying images can be employed, in accordance with an embodiment of the present disclosure. The system 100 comprises tracking means 124, the display device 101, a multiscopic optical element 126 arranged on an optical path of the display device 101, and at least one processor (not shown). The at least one processor is configured to:

determine a relative location of a first eye 128*a* and of a second eye 128*b* of at least one user with respect to an image plane of the display device 101, by utilising the tracking means 124, wherein the given image is a light field image that is generated or retrieved based on the relative location of the first eye 128*a* and of the second eye 128*b* of the at least one user with respect to the image plane; and control the multiscopic optical element 126, based on the relative location of the first eye 128*a* and of the second eye 128*b* of the at least one user with respect to the image plane, to direct light corresponding to a first set of pixels and a second set of pixels of the light field image to produce a first part and a second part of a synthetic light field 130, respectively, for the first eye 128*a* and the second eye 128*b* of the at least one user.

Optionally, the system 100 further comprises an optical combiner 132 arranged on an optical path of the display device 101 and on an optical path of a real-world light field 134 of a real-world environment 136, wherein the optical combiner 132 is employed to reflect the first part and the second part of the synthetic light field 130 towards the first eye 128*a* and the second eye 128*b* of the at least one user, whilst optically combining the real-world light field 134 with the first part and the second part of the synthetic light field 130, respectively.

In the real-world environment 136, there are one or more real-world objects, depicted as a real-world object 138 (shown as a tree, for illustration purposes only). The first part and the second part of the synthetic light field 130 present at least one virtual object, depicted as a virtual object 140 (shown as a star, for illustration purposes only).

FIGS. 1A-1E are merely examples, which should not unduly limit the scope of the claims herein. A person skilled in the art will recognize many variations, alternatives, and modifications of embodiments of the present disclosure.

Figure 2:
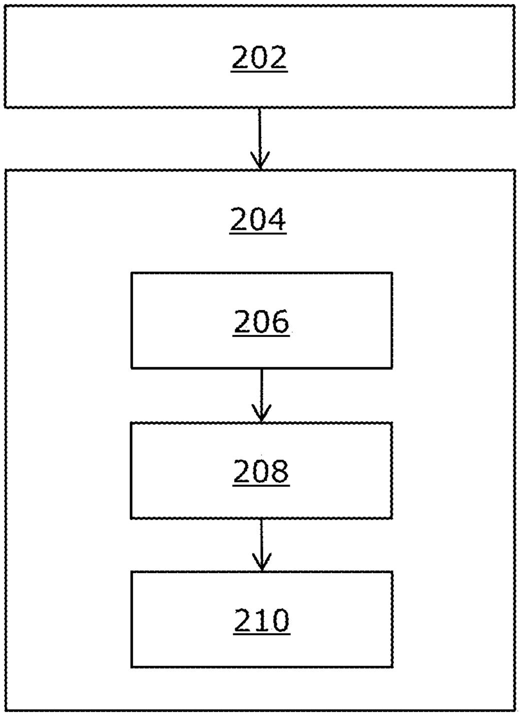
FIG. 2 depicts steps of a method for displaying images by using such a display device, in accordance with an embodiment of the present disclosure.

Referring to FIG. 2, illustrated are steps of a method for displaying images, in accordance with an embodiment of the present disclosure. At step 202, at least one predefined sequence in which sub-images of a given image are to be displayed via a display device is obtained. The display device comprises a backlight unit comprising a plurality of light sources that are controllable to switch between lights of different colours, and an active panel comprising a liquid crystal (LC) layer comprising a plurality of LC cells, a linear polarizer arranged on an optical path of the LC layer, and a drive circuit employed to individually control the plurality of LC cells of the LC layer. At step 204, the sub-images of the given image are displayed by employing temporal multiplexing. Each of the sub-images corresponds to a respective one of at least two different colours. The step 204 comprises steps 206, 208 and 210.

At step 206, different sets of drive signals are generated corresponding to respective ones of the sub-images of the given image, based on the at least one predefined sequence in which the sub-images are to be displayed. For a given sub-image, a corresponding set of drive signals is generated to individually control the plurality of LC cells of the LC layer, based on intensity values of pixels in the given sub-image. At step 208, the different sets of drive signals are sent to the drive circuit according to the at least one predefined sequence in which the sub-images are to be displayed. At step 210, the plurality of LC cells of the LC layer are controlled individually, via the drive circuit, using the different sets of drive signals according to the at least one predefined sequence, whilst controlling the backlight unit to switch between lights of the at least two different colours according to the at least one predefined sequence in which the sub-images are to be displayed via the display device.

The aforementioned steps are only illustrative and other alternatives can also be provided where one or more steps are added, one or more steps are removed, or one or more steps are provided in a different sequence without departing from the scope of the claims herein.

The invention claimed is:

1. A system comprising:

tracking means;

a display device comprising:

a backlight unit comprising a plurality of light sources that are controllable, to switch between lights of different colours;

an active panel comprising:

a liquid crystal (LC) layer comprising a plurality of LC cells;

a linear polarizer arranged on an optical path of the LC layer; and a drive circuit employed to individually control the plurality of LC cells of the LC layer; and at least one processor configured to:

obtain at least one predefined sequence in which sub-images of a given image are to be displayed via the display device, wherein each of the sub-images corresponds to a respective one of at least two different colours; and display the sub-images of the given image by employing temporal multiplexing, wherein when displaying the sub-images of the given image, the at least one processor is configured to:

generate different sets of drive signals corresponding to respective ones of the sub-images of the given image, based on the at least one predefined sequence in which the sub-images are to be displayed, wherein for a given sub-image, a corresponding set of drive signals is generated to individually control the plurality of LC cells of the LC layer, based on intensity values of pixels in the given sub-image;

send the different sets of drive signals to the drive circuit according to the at least one predefined sequence in which the sub-images are to be displayed; and control individually, via the drive circuit, the plurality of LC cells of the LC layer using the different sets of drive signals according to the at least one predefined sequence, whilst controlling the backlight unit to switch between lights of the at least two different colours according to the at least one predefined sequence in which the sub-images are to be displayed via the display device;

the system further comprising:

a multiscopic optical element arranged on an optical path of the display device; and at least one processor configured to:

determine a relative location of a first eye and of a second eye of at least one user with respect to an image plane of the display device, by utilising the tracking means, wherein the given image is a light field image that is generated or retrieved based on the relative location of the first eye and of the second eye of the at least one user with respect to the image plane; and control the multiscopic optical element, based on the relative location of the first eye and of the second eye of the at least one user with respect to the image plane, to direct light corresponding to a first set of pixels and a second set of pixels of the light field image to produce a first part and a second part of a synthetic light field, respectively, for the first eye and the second eye of the at least one user, wherein the system further comprises an optical combiner arranged on an optical path of the display device and on an optical path of a real-world light field of a real-world environment, wherein the optical combiner is employed to reflect the first part and the second part of the synthetic light field towards the first eye and the second eye of the at least one user, whilst optically combining the real-world light field with the first part and the second part of the synthetic light field.

2. The display device of claim 1, wherein the at least one processor is configured to display sub-images of another given image by employing temporal multiplexing, wherein the sub-images of the another given image are displayed according to at least one another predefined sequence, the at least one another predefined sequence being different from the at least one predefined sequence employed for the given image.

3. The display device of claim 1, wherein the at least one predefined sequence in which the sub-images of the given image are to be displayed is obtained based on colours of at least one virtual object being presented by the given image.

4. The display device of claim 3, wherein the backlight unit is colour-adjustable on a per-region basis, the at least one predefined sequence comprising at least two different predefined sequences, wherein when obtaining the at least one predefined sequence, the at least one processor is configured to obtain the at least two different predefined sequences to be employed for respective ones of at least two different regions of the given image, based on colours of different parts of the at least one virtual object being presented respectively by the at least two different regions of the given image.

5. The display device of claim 1, wherein the backlight unit is colour-adjustable on a per-region basis, the at least one predefined sequence comprising a first predefined sequence and a second predefined sequence, wherein the at least one processor is configured to:

obtain information indicative of a gaze direction of a user; and determine a first region and a second region of the given image, based on the gaze direction of the user, wherein the second region surrounds the first region, wherein when obtaining the at least one predefined sequence, the at least one processor is configured to obtain the first predefined sequence and the second predefined sequence to be employed for the first region and the second region of the given image, respectively.

6. The display device of claim 1, wherein the at least one processor is configured to:

detect when at least a region of a next image is to present an emergency notification to a user; and when it is detected that at least the region of the next image is to present the emergency notification to the user, control the backlight unit to produce light of a same colour for sub-images of the next image;

generate a same set of drive signals for the sub-images of the next image, to individually control the plurality of LC cells of the LC layer according to intensity values of pixels in one of the sub-images that corresponds to the same colour;

send the same set of drive signals to the drive circuit for the sub-images of the next image; and control individually, via the drive circuit, the plurality of LC cells of the LC layer using the same set of drive signals, whilst the backlight unit is controlled to produce the light of the same colour, thereby displaying the next image using the same colour.

7. The display device of claim 1, wherein the backlight unit is colour-adjustable on a per-region basis, wherein the at least one processor is configured to:

detect when a region of a next image is to present an emergency notification to a user; and when it is detected that the region of the next image is to present the emergency notification to the user, determine a region of the backlight unit that corresponds to said region of the next image;

control said region of the backlight unit to produce light of a same colour, whilst controlling a remaining region of the backlight unit to switch between lights of at least two different colours according to a corresponding predefined sequence in which the sub-images of the next image are to be displayed via the display device;

generate a same set of drive signals for respective regions of the sub-images of the next image that correspond to said region of the next image, whilst generating different sets of drive signals for respective ones of remaining regions of the sub-images of the next image, based on the corresponding predefined sequence in which the sub-images are to be displayed; and send, to the drive circuit, the same set of drive signals for said respective regions of the sub-images of the next image, and the different sets of drive signals for the respective ones of said remaining regions of the sub-images of the next image according to the corresponding predefined sequence in which the sub-images are to be displayed.

8. The display device of claim 1, wherein the plurality of light sources of the backlight unit are implemented as at least one white light source and at least one colour wheel arranged on an optical path of the at least one white light source, wherein the at least one colour wheel comprises colour filters of primary colours.

9. The display device of claim 1, wherein the plurality of light sources of the backlight unit are implemented as a plurality of laser light sources of primary colours, the backlight unit further comprising a light guide employed to guide light emitted by the plurality of light sources towards the active panel, wherein the plurality of laser light sources are individually controllable.

10. The display device of claim 1, wherein the plurality of light sources of the backlight unit are implemented as an array of light-emitting elements of primary colours, wherein the light-emitting elements of said array are individually controllable.

11. The display device of claim 10, wherein a given sub-image of the given image corresponds to one of the primary colours, wherein when displaying the given sub-image, the at least one processor is configured to:

activate light-emitting elements of the one of the primary colours in at least a region of said array, to produce light of the one of the primary colours at full brightness; and simultaneously, activate a first predefined percent of light-emitting elements of at least one other of the primary colours in at least said region of said array, to produce light of the at least one other of the primary colours at a second predefined percent of full brightness.

12. The display device of claim 10, wherein another given sub-image of the given image corresponds to a non-primary colour that corresponds to additive mixing of a first primary colour and a second primary colour, wherein when displaying the another given sub-image, the at least one processor is configured to:

activate light-emitting elements of the first primary colour in at least a region of said array, to produce light of the first primary colour; and simultaneously, activate light-emitting elements of the second primary colour in at least said region of said array, to produce light of the second primary colour.

13. A method comprising:

obtaining at least one predefined sequence in which sub-images of a given image are to be displayed via a display device, wherein the display device comprises a backlight unit comprising a plurality of light sources that are controllable to switch between lights of different colours, and an active panel comprising a liquid crystal (LC) layer comprising a plurality of LC cells, a linear polarizer arranged on an optical path of the LC layer, and a drive circuit employed to individually control the plurality of LC cells of the LC layer; and displaying the sub-images of the given image by employing temporal multiplexing, wherein each of the sub-images corresponds to a respective one of at least two different colours, wherein the step of displaying the sub-images of the given image comprises:

generating different sets of drive signals corresponding to respective ones of the sub-images of the given image, based on the at least one predefined sequence in which the sub-images are to be displayed, wherein for a given sub-image, a corresponding set of drive signals is generated to individually control the plurality of LC cells of the LC layer, based on intensity values of pixels in the given sub-image;

sending the different sets of drive signals to the drive circuit according to the at least one predefined sequence in which the sub-images are to be displayed; and controlling individually, via the drive circuit, the plurality of LC cells of the LC layer using the different sets of drive signals according to the at least one predefined sequence, whilst controlling the backlight unit to switch between lights of the at least two different colours according to the at least one predefined sequence in which the sub-images are to be displayed via the display device;

the method further comprising:

determining a relative location of a first eye and of a second eye of at least one user with respect to an image plane of the display device, by utilising a tracking means, wherein the given image is a light field image that is generated or retrieved based on the relative location of the first eye and of the second eye of the at least one user with respect to the image plane; and controlling a multiscopic optical element, arranged on an optical path of the display device, based on the relative location of the first eye and of the second eye of the at least one user with respect to the image plane, to direct light corresponding to a first set of pixels and a second set of pixels of the light field image to produce a first part and a second part of a synthetic light field, respectively, for the first eye and the second eye of the at least one user, employing an optical combiner arranged on an optical path of the display device and on an optical path of a real-world light field of a real-world environment, to reflect the first part and the second part of the synthetic light field towards the first eye and the second eye of the at least one user, whilst optically combining the real-world light field with the first part and the second part of the synthetic light field.

14. The method of claim 13, further comprising displaying sub-images of another given image by employing temporal multiplexing, wherein the sub-images of the another given image are displayed according to at least one another predefined sequence, the at least one another predefined sequence being different from the at least one predefined sequence employed for the given image.

15. The method of claim 13, wherein the at least one predefined sequence in which the sub-images of the given image are to be displayed is obtained based on colours of at least one virtual object being presented by the given image, wherein optionally, the backlight unit is colour-adjustable on a per-region basis, and the at least one predefined sequence comprises at least two different predefined sequences, and wherein the step of obtaining the at least one predefined sequence comprises obtaining the at least two different predefined sequences to be employed for respective ones of at least two different regions of the given image, based on colours of different parts of the at least one virtual object being presented respectively by the at least two different regions of the given image.

16. The method of claim 13, wherein the backlight unit is colour-adjustable on a per-region basis, the at least one predefined sequence comprising a first predefined sequence and a second predefined sequence, wherein the method further comprises:

obtaining information indicative of a gaze direction of a user; and determining a first region and a second region of the given image, based on the gaze direction of the user, wherein the second region surrounds the first region, wherein the step of obtaining the at least one predefined sequence comprises obtaining the first predefined sequence and the second predefined sequence to be employed for the first region and the second region of the given image, respectively.

17. The method of claim 13, further comprising:

detecting when at least a region of a next image is to present an emergency notification to a user; and when it is detected that at least the region of the next image is to present the emergency notification to the user, controlling the backlight unit to produce light of a same colour for sub-images of the next image;

generating a same set of drive signals for the sub-images of the next image, to individually control the plurality of LC cells of the LC layer according to intensity values of pixels in one of the sub-images that corresponds to the same colour;

sending the same set of drive signals to the drive circuit for the sub-images of the next image; and controlling individually, via the drive circuit, the plurality of LC cells of the LC layer using the same set of drive signals, whilst the backlight unit is controlled to produce the light of the same colour, thereby displaying the next image using the same colour.

18. The method of claim 13, wherein the backlight unit is colour-adjustable on a per-region basis, wherein the method further comprises:

detecting when a region of a next image is to present an emergency notification to a user; and when it is detected that the region of the next image is to present the emergency notification to the user, determining a region of the backlight unit that corresponds to said region of the next image;

controlling said region of the backlight unit to produce light of a same colour, whilst controlling a remaining region of the backlight unit to switch between lights of at least two different colours according to a corresponding predefined sequence in which the sub-images of the next image are to be displayed via the display device;

generating a same set of drive signals for respective regions of the sub-images of the next image that correspond to said region of the next image, whilst generating different sets of drive signals for respective ones of remaining regions of the sub-images of the next image, based on the corresponding predefined sequence in which the sub-images are to be displayed; and sending, to the drive circuit, the same set of drive signals for said respective regions of the sub-images of the next image, and the different sets of drive signals for the respective ones of said remaining regions of the sub-images of the next image according to the corresponding predefined sequence in which the sub-images are to be displayed.

19. The method of claim 13, wherein the plurality of light sources of the backlight unit are implemented as an array of light-emitting elements of primary colours, wherein the light-emitting elements of said array are individually controllable, wherein optionally, a given sub-image of the given image corresponds to one of the primary colours, and wherein the step of displaying the given sub-image comprises:

activating light-emitting elements of the one of the primary colours in at least a region of said array, to produce light of the one of the primary colours at full brightness; and simultaneously, activating a first predefined percent of light-emitting elements of at least one other of the primary colours in at least said region of said array, to produce light of the at least one other of the primary colours at a second predefined percent of full brightness.

20. The method of claim 19, wherein another given sub-image of the given image corresponds to a non-primary colour that corresponds to additive mixing of a first primary colour and a second primary colour, and wherein the step of displaying the another given sub-image comprises:

activating light-emitting elements of the first primary colour in at least a region of said array, to produce light of the first primary colour; and simultaneously, activating light-emitting elements of the second primary colour in at least said region of said array, to produce light of the second primary colour.

* * * * *